(12) United States Patent
Wagener et al.

(10) Patent No.: US 10,712,937 B2
(45) Date of Patent: Jul. 14, 2020

(54) DEVICE FOR MANAGING AND CONFIGURING FIELD DEVICES IN AN AUTOMATION INSTALLATION

(71) Applicant: ABB Technology AG, Zurich (CH)

(72) Inventors: Dirk Wagener, Stadthagen (DE);
Christoph Welte, Neu-Ulm (DE);
Marcus Heege, Kaisersesch (DE);
Wolfgang Mahnke, Hettenleidelheim (DE); Marko Schlueter, Espelkamp (DE)

(73) Assignee: ABB SCHWEIZ AG, Baden (CH)

( * ) Notice: Subject to any disclaimer, the term of this patent is extended or adjusted under 35 U.S.C. 154(b) by 582 days.

(21) Appl. No.: 14/975,944

(22) Filed: Dec. 21, 2015

(65) Prior Publication Data

US 2016/0179303 A1   Jun. 23, 2016

(30) Foreign Application Priority Data

Dec. 22, 2014 (DE) .................. 10 2014 019 368

(51) Int. Cl.
*G06F 3/0488* (2013.01)
*G06F 3/0482* (2013.01)
*G06F 3/0483* (2013.01)

(52) U.S. Cl.
CPC ........ *G06F 3/04886* (2013.01); *G06F 3/0482* (2013.01); *G06F 3/0483* (2013.01); *G05B 2219/32128* (2013.01)

(58) Field of Classification Search
None
See application file for complete search history.

(56) References Cited

U.S. PATENT DOCUMENTS 6,373,584 B1 * 4/2002 Barney ............... B41F 33/0009
355/85
7,698,142 B2 * 4/2010 Washburn ................ A61B 8/13
704/231

(Continued)

FOREIGN PATENT DOCUMENTS

CN   101426107 A   5/2009
CN   102269989 A   12/2011

(Continued)

OTHER PUBLICATIONS

Beyond Compare, internet forum How to make "Expand all" in Folder View default?, available at https://www.scootersoftware.com/vbulletin/forum/beyond-compare-3-discussion/folder-compare/7057-how-to-make-expand-all-in-folder-view-default (Year: 2011).*

(Continued)

*Primary Examiner* — James T Tsai
(74) *Attorney, Agent, or Firm* — Leydig, Voit & Mayer, Ltd.

(57) ABSTRACT

A method and device for managing and configuring field devices in an automation installation has a configuration tool that is designed to physically identify a field device in the automation installation, to logically incorporate it into the automation installation and to configurate it in the automation installation, wherein the configuration tool to this end resorts to a prescribed first field-device-specific information package that describes the functions and data of the field device at least in part. The screen may have a first screen element provided on it that has a plurality of second screen elements in a first orientation and a plurality of third screen elements, which are each subordinate to a second screen element, in a second orientation, wherein precisely one second screen element and at least one third screen element, (Continued)

which are logically connected to one another, are arranged along the second orientation.

11 Claims, 2 Drawing Sheets

(56) References Cited

U.S. PATENT DOCUMENTS

| | | | | |
|---|---|---|---|---|
| 7,761,698 | B2* | 7/2010 | Ichtertz | G05B 19/042 |
| | | | | 713/1 |
| 2007/0244584 | A1 | 10/2007 | John et al. | |
| 2008/0046104 | A1 | 2/2008 | Van Camp et al. | |
| 2009/0019381 | A1* | 1/2009 | Kimoto | A61B 1/00009 |
| | | | | 715/764 |
| 2010/0313156 | A1 | 12/2010 | Louch et al. | |
| 2011/0230980 | A1 | 9/2011 | Hammack et al. | |
| 2012/0084644 | A1 | 4/2012 | Robert et al. | |
| 2012/0250544 | A1* | 10/2012 | Sasaki | G05B 19/4184 |
| | | | | 370/252 |
| 2012/0254792 | A1* | 10/2012 | Husoy | G06F 3/0481 |
| | | | | 715/782 |
| 2014/0100668 | A1* | 4/2014 | Jundt | G06F 3/0484 |
| | | | | 700/11 |
| 2014/0108985 | A1* | 4/2014 | Scott | G06F 3/0484 |
| | | | | 715/771 |
| 2014/0181676 | A1* | 6/2014 | Samborskyy | H04L 41/22 |
| | | | | 715/736 |
| 2014/0214240 | A1* | 7/2014 | Funke | G07C 3/00 |
| | | | | 701/2 |

FOREIGN PATENT DOCUMENTS

| | | |
|---|---|---|
| CN | 102460370 A | 5/2012 |
| CN | 102880624 A | 1/2013 |
| CN | 103150158 A | 6/2013 |
| CN | 103210371 A | 7/2013 |
| CN | 103902187 A | 7/2014 |
| CN | 104216619 A | 12/2014 |
| DE | 10245890 A1 | 4/2004 |
| DE | 10245890 B4 | 4/2004 |
| DE | 10357276 A1 | 7/2005 |
| DE | 102008010484 A1 | 8/2009 |
| DE | 102008012104 A1 | 9/2009 |
| DE | 102007038340 A1 | 11/2012 |
| WO | WO 2010144331 A2 | 12/2010 |
| WO | WO 2014058889 A1 | 4/2014 |

OTHER PUBLICATIONS

Jan Miettinen, "The Lively Dock: Web Applications as Live Thumbnails" 2010 12th IEEE International Symposium on Web Systems Evolution (WSE) (pp. 117-120) (Year: 2010).*

* cited by examiner

DEVICE FOR MANAGING AND CONFIGURING FIELD DEVICES IN AN AUTOMATION INSTALLATION

CROSS-REFERENCE TO RELATED APPLICATIONS

Priority is claimed to German Patent Application No. DE 10 2014 019 368.3, filed on Dec. 22, 2014, the entire disclosure of which is hereby incorporated by reference herein.

FIELD

The invention relates to a device for managing and configuring field devices in an automation installation.

BACKGROUND

Automation systems for controlling a technical process or a technical installation usually comprise a control device (PLC), which are integrated in a complex comprising a multiplicity of intelligent electrical devices. Intelligent electronic devices are microprocessor-based devices such as protective and control devices, motor protection devices, intelligent switches and voltage regulators, frequency converters, pressure and temperature measurement transducers, flowmeters and servo drives.

The article "FDI Device Integration—Best of Both Worlds", atp edition June 2010, pages 16 to 19, discloses the practice of integrating field devices with the FDI concept (Field Device Integration IEC—62769) into an automation installation. The basis for this concept is the provision of information for configuring field devices in a device-specific FDI package. This FDI package comprises a firmly prescribed quantity of information that consists of device definition, business logic, user interface description and user interface plugins. The device definition comprises management information and the device model. The business logic describes the communication logic for the device and is used for ensuring consistency for the device model. The user interface description describes the presentation of the device parameters and device functions. The user interface plugins are programmed components of interface portions for presenting the device parameters and functions.

When field devices are configured by means of EDD (Electronic Device Description) technology IEC 61804, a device manufacturer provides an EDD that contains information about the communication with the device, the business logic and the user interfaces, that is to say what input masks should be presented to a user. By way of example, the business logic includes when what parameters can be written.

FDI technology uses these mechanisms of the EDD and provides the concept of the FDI package, in which, besides an EDD, other information such as a user handbook can be included, but also what are known as UIPs (User Interface Plugins), which provide further user interfaces in other technologies, such as .NET Assemblies, which, in contrast to EDD-based user interfaces, consist of programmed code compiled to form a component.

FDI packages are typically produced by device manufacturers and used by system manufacturers in order to integrate and configure the devices of the device manufacturers in their system.

The EDD may define not only a single user element with various parameters, graphs and other elements but also new windows and dialogs. In this case, a host has certain degrees of freedom and, by way of example, can present a plurality of menus defined in the EDD in different windows simultaneously, or else user interfaces of different device instances.

Known EDD host systems either restrict the number of windows or open any number of windows for the different devices. The user then loses sight of the association between the windows and the devices.

Furthermore, the EDD specification allows an input context to be defined that contains changes to a device configuration that the user has already made on the interface but has not yet written to the device or the offline configuration. In this case, it is possible, according to the specification, for different windows and dialogs to work on different input contexts for the same device. This concept makes it even more difficult for a user to associate the windows not just with the device but also with a particular input context.

According to the prior art, EDD host systems display the windows described in the EDD as windows of the application, so that the user can compare a plurality of window contents with one another. However, the windows are quite difficult to associate with a particular device instance and even more difficult to associate with a particular input context of this device instance. When a user wishes to apply or reject an input context, it is therefore difficult to identify which windows are affected thereby.

In such a programming tool, information relating to the devices is visualized and functions such as parameterization operations are performed. To this end, the user first needs to select a device from a multiplicity of devices.

In known programming tools, one and the same device is furthermore disadvantageously presented in different ways. For example, a different device object and symbol is displayed in the tree structure than in the list presentation of the devices. The device functionality also differs on the basis of the form of presentation. The presentation is nonuniform and therefore difficult for the user to learn. The different presentations also differ in terms of device functionality that the user can perform. Hence, the user cannot perform the same design functions in the list presentation as if he were to take the device object in the tree. The user thus has to know in which presentation he can find and perform which device functions.

The user has the option of bringing already open windows or presentations to the foreground. For this, there are various options that are all based on a preview. This preview is either always visible and shows all currently open windows or else the user moves the mouse over an application and is then provided with a display of a preview of the open windows of this application.

The preview of the open windows is not directly related to the program functions that have been used to open the individual windows. There is therefore no possibility of association of the operator control element that has been used to open this window. Hence, the user cannot explicitly identify how he can open a similar window or with what functionality an open window is associated.

DE 102 45 890 B4 discloses a screen element, HMI device, automation system and computer program product for visualization and project planning for singly and repeatedly used user texts and the points of use that are assigned in a data processing system. The disclosure reveals that the devices are provided for selection in a hierarchic tree structure, with each branch that ramifies further having an associated user text and each branch that does not ramify further having an associated combination of a user text and a point of use. Details for a device are stored in nested menu levels. This turns operator control and particularly searching for details for a device into a time consuming process.

SUMMARY

An aspect of the invention provides a device for managing and configuring field devices in an automation installation, the device comprising: a configuration tool, designed to physically identify a field device in the automation installation, to logically incorporate the field device into the automation installation, and to configure the field device in the automation installation, the configuration tool, to this end, using a prescribed first field-device-specific information package that describes the functions and data of the field device at least in part; and a screen, wherein the screen includes a first screen element, provided on the screen, including a plurality of second screen elements in a first orientation and a plurality of third screen elements, wherein the third screen elements are each subordinate to a second screen element, in a second orientation, wherein precisely one second screen element and at least one third screen element, which are logically connected to one another, are arranged along the second orientation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
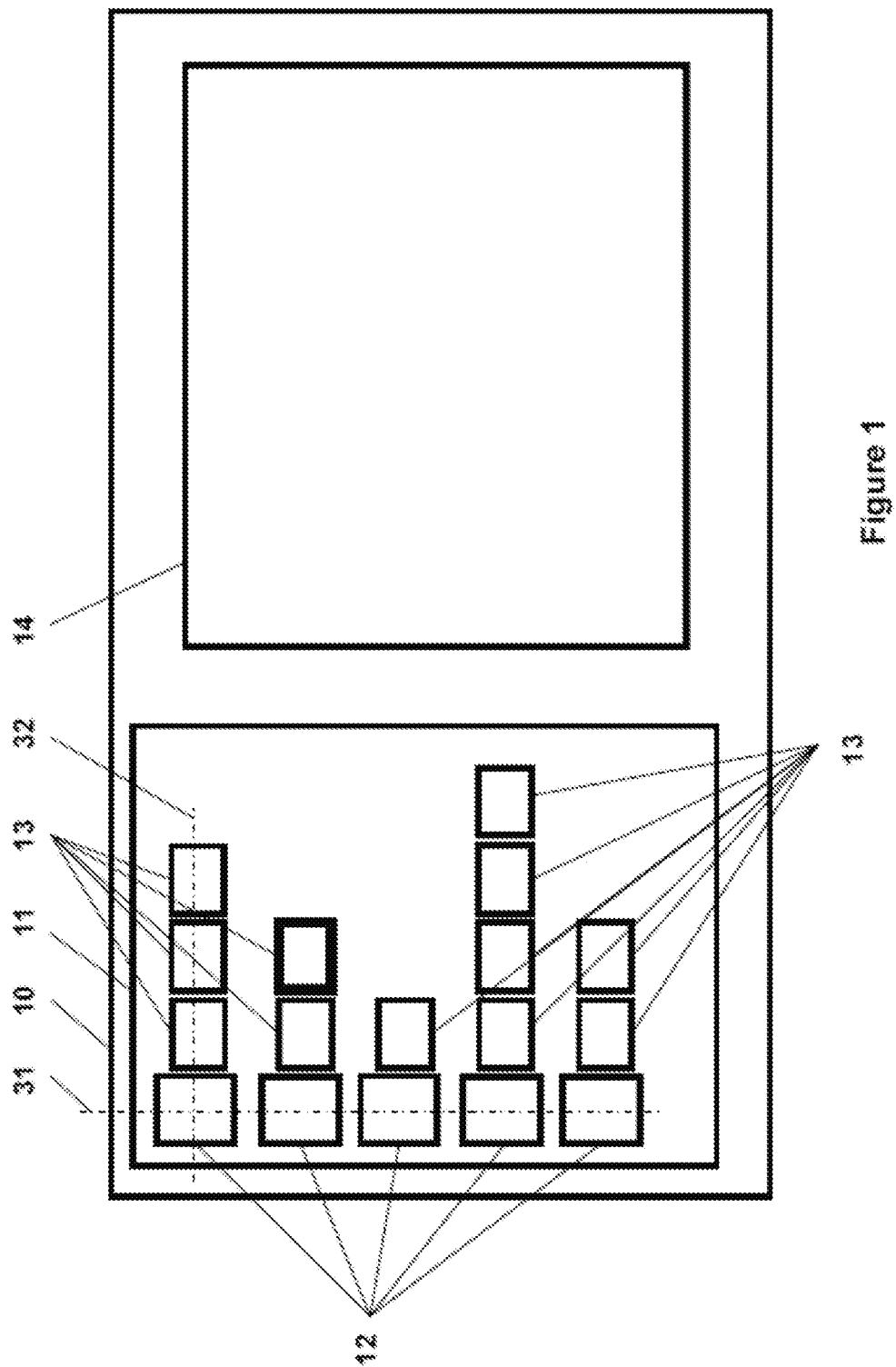
FIG. 1 shows a basic illustration of a screen of a configuration tool with first, second and third screen elements

An aspect of the invention provides a device for managing and configuring field devices in an automation installation, used particularly in process automation or machine control for controlling processes and/or installation components.

An aspect of the invention provides a device for managing and configuring field devices in an automation installation for which clarity is retained even when there are a multiplicity of simultaneously processed devices and functions.

An aspect of the invention provides an apparatus for managing and configuring field devices in an automation installation with a configuration tool that is designed to physically identify a field device in the automation installation, to logically incorporate it into the automation installation and to configure it in the automation installation, wherein the configuration tool to this end resorts to a prescribed field-device-specific information package that describes the functions and data of the field device at least in part.

According to an aspect of the invention, a first screen element is provided that has a plurality of second screen elements in a first orientation and a plurality of third screen elements, which are each subordinate to a second screen element, in a second orientation, wherein precisely one second screen element and at least one third screen element, which are logically connected to one another, are arranged along the second orientation.

The second orientation is oriented at least approximately transversely with respect to the first orientation. This results in an approximate matrix structure comprising second and third screen elements within the first screen element.

Advantageously, the association between third screen elements and the second screen elements along the second orientation is clearly identifiable within this matrix structure. Furthermore, in a clear manner, the available second and third screen elements are arranged in the first screen element and identifiable.

According to a further feature of the invention, the first screen element is a menu, the second screen elements are the available functions of the configuration tool and the third screen elements are representatives of the windows that are open for the functions. In this case, within the menu, the functions of the configuration tool are arranged in the first orientation and the representatives of the windows that are open for the functions are arranged in the second orientation. Each representative is logically combined with an open window of the configuration tool. When a representative is operated, the logically combined window of the configuration tool is displayed in the foreground on a screen of the configuration tool.

Advantageously, the number and type of open windows of the configuration tool and their association with one of the available functions in the matrix structure are presented clearly in the open menu. A single operator control action—opening the menu—allows all available functions and all open windows in the form of their representatives to be grasped and processed.

According to a further feature of the invention, the first orientation is approximately vertical and the second orientation is approximately horizontal. Hence, the second screen elements, the functions of the configuration tool, are arranged in a column and the third screen elements, the representatives of the windows that are open for the functions, are arranged in rows.

According to a further feature of the invention, the representative of the currently active window of the configuration tool is presented in highlighted form.

According to a further feature of the invention, the representatives are presented as a thumbnail of the window of the configuration tool.

According to a further feature of the invention, the representative displayed is the title of the window of the configuration tool.

According to a further feature of the invention, the representatives are presented as a thumbnail with the title of the window of the configuration tool.

According to a further feature of the invention, the representatives have a first operator control element that is linked to a function that, when called, closes the represented window.

According to a further feature of the invention, the representatives have at least one second operator control element that is directed at an adjacent representative and is linked to a function that, when called, directs the focus at an adjacent representative and displays the associated window of this adjacent representative in the foreground on the screen of the configuration tool.

Advantageously, the focus on a representative and the associated window is navigable within the menu on a row-by-row and column-by-column basis using all the usual control tools of a configuration tool—keyboard, mouse, touch-sensitive screen.

FIG. 1 contains a basic representation of a screen 10 of a configuration tool. On the screen 10, a first screen element 11 and an open window 14, which is subsequently called the active window 14, are presented. The active window 14 is always in the foreground and ready for processing. Further open windows may be concealed behind the active window 14 in a partially or completely overlapping manner.

The first screen element 11 comprises a plurality of second screen elements 12 in a first orientation 31 and a plurality of third screen elements 13, which are each subordinate to a second screen element 12, in a second orientation 32, precisely one second screen element 12 and at least one third screen element 13, which are logically connected to one another, being arranged along the second orientation 32.

The first orientation 31 and the second orientation 32 are represented by dash-dot lines in FIG. 1. The second orientation 32 is oriented at least approximately transversely with respect to the first orientation 31. This results in an approximate matrix structure comprising second and third screen elements 12, 13 within the first screen element 11.

In a further embodiment of the invention as shown in the representation in FIG. 1, the first orientation 31 is approximately vertical and the second orientation 32 is approximately horizontal.

The first screen element 11 is a menu and is subsequently called the menu 11. The second screen elements 12 represent the available functions of the configuration tool and are subsequently called functions 12. The third screen elements 13 are representatives of the windows that are open for the functions 12 and are subsequently called representatives 13.

In the embodiment shown, the functions 12 are arranged approximately vertically below one another along the first orientation 31, while the representatives 13 are arranged approximately horizontally along the second orientation 32.

Each representative 13 is logically combined with an open window of the configuration tool. When a representative 13 is operated, the logically combined window of the configuration tool is displayed in the foreground on a screen of the configuration tool. This window is then the active window 14.

In a further embodiment of the invention, the representative 13 of the currently active window 14 of the configuration tool is presented in highlighted form. In FIG. 1, a representative 13 is highlighted by a reinforced frame line by way of example. However, the highlighting can be represented in any other, suitable manner. Color highlighting is particularly advantageous.

Figure 2:
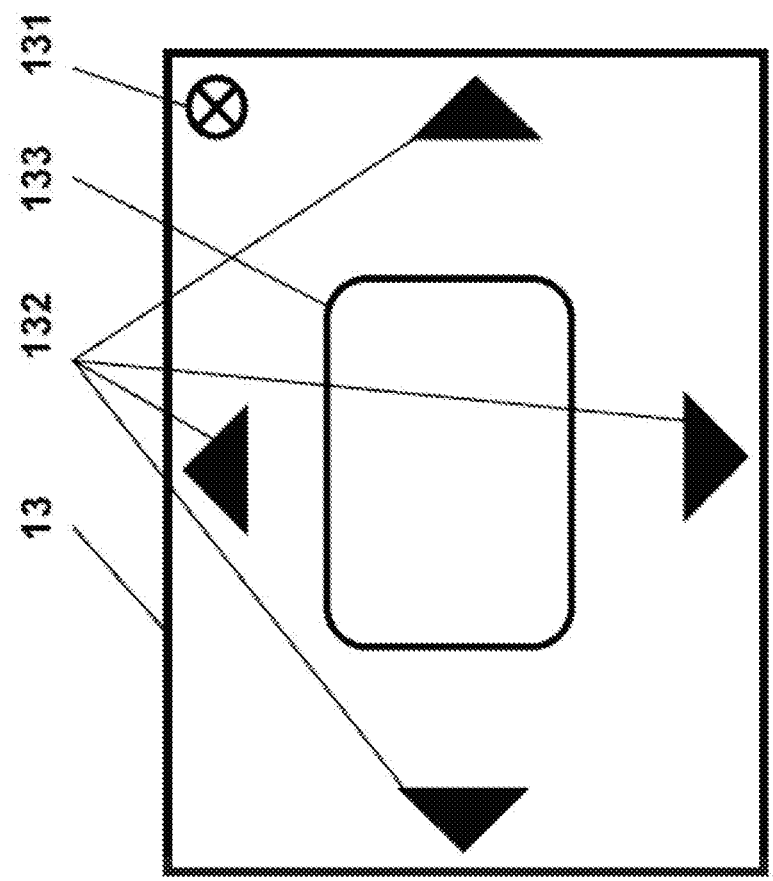
FIG. 2 shows a detailed representation of a third screen element

FIG. 2 shows a representative 13 in more detail. The representative 13 has a descriptor 133. In an extremely simple embodiment of the invention, the title of the window of the configuration tool is presented as the descriptor 133. In a further embodiment of the invention, a thumbnail of the represented window of the configuration tool is presented as the descriptor 133. In a further embodiment of the invention, a thumbnail of the represented window of the configuration tool and the title thereof are presented as the descriptor 133.

In a further embodiment of the invention, the representative 13 has a first operator control element 131 that is linked to a function that, when called, closes the represented window.

In an embodiment of the invention that is shown in FIG. 1, the operator control element 131 is a symbol that is associated with the visible region of the respective representative 13.

In an alternative embodiment of the invention, which is not shown in more detail, the operator control element 131 is associated with the context menu of the respective representative 13.

In a further embodiment of the invention, the representatives 13 have at least one second operator control element 132 that is directed at an adjacent representative 13 and is linked to a function that, when called, directs the focus at an adjacent representative 13 and displays the associated window of this adjacent representative 13 on the screen 10 of the configuration tool in the foreground as the active window 14.

In this case, the focus on a representative 13 and the associated window is navigable within the menu 11 on a row-by-row and column-by-column basis using all the usual control tools of a configuration tool—keyboard, mouse, touch-sensitive screen.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS 10 screen
11 first screen element
12 second screen element
13 third screen element
131 first operator control element
132 second operator control element
133 descriptor
14 active window
31 first orientation
32 second orientation

The invention claimed is:

1. A device for managing and configuring field devices in an automation installation, including identifying a field device in the automation installation, logically incorporating the field device into the automation installation, and configuring the field device in the automation installation using a prescribed first field-device-specific information package that describes the functions and data of the field device at least in part, the device comprising a screen, wherein the screen comprises a first screen element and an active window, wherein the first screen element comprises a plurality of second screen elements in a first orientation and a plurality of third screen elements, wherein the third screen elements are each subordinate to a second screen element, in a second orientation, wherein precisely one second screen element and at least one third screen element, which are logically connected to one another, are arranged along the second orientation, wherein the first screen element is a menu, wherein the second screen elements are available functions for configuring the field device, wherein the third screen elements are representatives of windows that are open for the functions, wherein the third screen elements are each presented as a thumbnail of a respective one of the windows that are open for the functions, wherein operation (i.e. selection) of a third screen element of the plurality of third screen elements is configured to set that third screen element as representative of the actual active window and presents the operated third screen element in highlighted form, wherein the active window is always in the foreground and ready for processing, and wherein opening the menu makes viewable on the screen all available functions to configure the field device and all windows in representative form that are open for the available functions.

2. The device of claim 1, wherein the second orientation is oriented at least approximately transversely with respect to the first orientation.

3. The device of claim 1, wherein the second orientation is oriented transversely with respect to the first orientation.

4. The device of claim 2, wherein the first orientation is approximately vertical and the second orientation is approximately horizontal.

5. The device of claim 2, wherein the first orientation is vertical and the second orientation is horizontal.

6. The device of claim 1, wherein the third screen elements are representatives, each displaying a title of a respective window.

7. The device of claim 1, wherein the representatives are each presented as the thumbnail with a title of the respective window.

8. The device of claim 1, wherein the third screen elements are representatives, each including a first operator control element that is linked to a function that, when called, closes a respective represented window.

9. The device of claim 1, wherein the third screen elements are representatives, each including a second operator control element that is directed at an adjacent third screen element representative, and wherein the second operator control element is linked to a function that when called, directs a focus at the adjacent third screen element representative and displays an associated window of this adjacent third screen element representative in a foreground on the screen.

10. The device of claim 1, wherein the screen includes an open window element separate from the first screen element, the open window element including the windows that are open for the functions.

11. The device of claim 10, wherein the windows that are open for the functions includes the active window that is in the foreground of the open window element and a concealed window that is at least partially concealed by the active window.

\* \* \* \* \*